US007882745B2

(12) United States Patent
Huang et al.

(10) Patent No.: US 7,882,745 B2
(45) Date of Patent: Feb. 8, 2011

(54) METHOD AND SYSTEM TO INVERT TECTONIC BOUNDARY OR ROCK MASS FIELD IN IN-SITU STRESS COMPUTATION

(75) Inventors: YanSong Huang, Beijing (CN); GongRui Yan, Beijing (CN); Ian David Stowe, Carqyeuranne (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 472 days.

(21) Appl. No.: 11/852,257

(22) Filed: Sep. 7, 2007

(65) Prior Publication Data
US 2008/0071505 A1 Mar. 20, 2008

Related U.S. Application Data

(60) Provisional application No. 60/846,069, filed on Sep. 20, 2006.

(51) Int. Cl.
*G01N 3/00* (2006.01)
(52) U.S. Cl. .......................................................... 73/760
(58) Field of Classification Search .................. 73/760, 73/784
See application file for complete search history.

(56) References Cited

U.S. PATENT DOCUMENTS

| | | | | |
|---|---|---|---|---|
| 5,417,103 | A * | 5/1995 | Hunter et al. ................... 73/37 |
| 5,675,088 | A * | 10/1997 | Serata .......................... 73/784 |
| 5,839,090 | A * | 11/1998 | Zoraster ......................... 702/5 |
| 5,999,486 | A * | 12/1999 | DeVault ........................ 367/36 |
| 6,011,557 | A * | 1/2000 | Keskes et al. ................ 345/582 |
| 6,246,963 | B1 * | 6/2001 | Cross et al. .................... 702/14 |
| 7,006,918 | B2 * | 2/2006 | Economides et al. ........... 702/1 |
| 7,062,072 | B2 * | 6/2006 | Anxionnaz et al. ........... 382/109 |
| 7,486,589 | B2 * | 2/2009 | Lee et al. ....................... 367/35 |
| 2002/0013687 | A1 * | 1/2002 | Ortoleva ....................... 703/10 |
| 2006/0100837 | A1 * | 5/2006 | Symington et al. ............ 703/10 |

OTHER PUBLICATIONS

A. Ledesma, A. Gens, E. E. Alonso, Parameter and Variance Estimation in Geotechnical Backanalysis Using Prior Information, International Journal for Numerical and Analytical Methods in Geomechanics, vol. 20, 1996, p. 119-141.

(Continued)

*Primary Examiner*—Lisa M Caputo
*Assistant Examiner*—Octavia Davis
(74) *Attorney, Agent, or Firm*—Hoffman Warnick LLC

(57) ABSTRACT

A method, system and computer program product for inverting boundary conditions for rock mass field in-situ stress computation for a geologic structure are disclosed. According to an embodiment, the current invention includes a method for inverting boundary conditions for rock mass field in-situ stress computation for a geologic structure, the method comprising: considering physical constraint of the geological structure; deriving and solving normal equations of penalized weighted least squares, said normal equations of penalized weighted least squares partially representing said physical constraint of the geological structure; and outputting boundary conditions and reproducing the rock mass field in-situ stress based on the result of said solved normal equations of penalized weighted least squares.

18 Claims, 3 Drawing Sheets

OTHER PUBLICATIONS

D. Ask, New Developments in the Integrated Stress Determination Method and Their Application to Rock Stress Data at the Äspö HRL, Sweden, International Journal of Rock Mechanics & Mining Sciences, Apr. 14, 2005, p. 1-20.

F. Tonon, B. Amadei, E. Pan, D. M. Frangopol, Bayesian Estimation of Rock Mass Boundary Conditions with Applications to the AECL Underground Research Laboratory, International Journal of Rock Mechanics & Mining Sciences, Jun. 22, 2001, p. 995-1027.

Richard A. Plumb, Keith F. Evans, Terry Engelder, Geophysical Log Responses and Their Correlation with Bed-to-Bed Stress Contrasts in Paleozoic Rocks, Appalachian Plateau, New York, Journal of Geophysical Research, vol. 96, No. B9, Aug. 10, 1991, p. 14,509-14,528.

S. D. McKinnon, Analysis of Stress Measurements Using A Numerical Model Methodology, International Journal of Rock Mechanics & Mining Sciences, Jul. 12, 2001, p. 699-709.

Keith F. Evans, Terry Engelder, Richard A. Plumb, Appalachian Stress Study 1. A Detailed Description of In Situ Stress Variations in Devonian Shales of the Appalachian Plateau, Journal of Geophysical Research, vol. 94, No. B6, Jun. 10, 1989, p. 7129-7154.

* cited by examiner

METHOD AND SYSTEM TO INVERT TECTONIC BOUNDARY OR ROCK MASS FIELD IN IN-SITU STRESS COMPUTATION

RELATED APPLICATION DATA

The present application claims priority under 35 U.S.C. §119 to U.S. Provisional Application Ser. No. 60/846,069, naming YanSong Huang, GongRui Yan, and Ian David Stowe as inventors, and filed Sep. 20, 2006, the entirety of which is incorporated herein by reference in its entirety for all purposes.

FIELD OF THE INVENTION

The present invention relates generally to geologic structure and hydrocarbon production. More particularly, the present invention relates to a method to invert boundary conditions for rock mass field in-situ stress computation for a geologic structure.

BACKGROUND OF THE INVENTION

Characteristics and evolution of the in-situ stress field have a significant influence over reservoir's formation, type and hydrocarbon distribution. The status of in-situ stress, especially the tectonic stress, has also a dominant effect on reservoir development, such as wellbore stability, hydraulic fracturing, sanding production, reservoir depletion process, casing failure and surface subsidence, et al. Analysis of the tectonic stress is, therefore, of great importance to reservoir studies.

Today's technologies allow us to model the rock mass and geological reservoir in-situ stress using 3D numerical modeling tools, in which the geological structure can be modeled by discrete elements or grids, and the tectonic activities/thermal stress by applying appropriate boundary loading conditions. Once the tectonic boundary conditions have been determined, it will be a simple matter to compute the in-situ stress field using the numerical model. However, how to invert the loading boundary from the measured data and field information is still one of the most difficult issues in the industry.

One of the big challenges for in-situ stress modeling comes from the complexity of in-situ stress itself. First of all, the in-situ stress was formed from its initial state of loose sediment to its present geological state which has undergone a long and complicated process, such as overburden deposition, repeated cycles of elevation and depression, tectonic forces and thermal effects. Furthermore, the mechanical erosions and thermal histories of the site under investigation may be complex, leading to additional loading path dependent sources of distortion of the in-situ stress field. Lastly, rock is rarely well represented by a homogeneous isotropic continuum medium as assumed in most of the geomechanical models.

Currently there are a few ways to approach the issue, but those ways have their own limitation. For example, "Integrated Stress Determination Approach" relies on a nonlinear least squares approach to determine the regional stress field based on local stress measurement, but the strong assumptions involved in the ISDA method, such as neglecting the lateral variations of stress and the rotation of the principal stress direction, restrain this model applicability in complex geological conditions. See, e.g., D. A S K, *New Developments in the Integrated Stress Determination Method and Their Application to Rock Stress Data at the Äspö HRL, Sweden, International Journal of Rock Mechanics & Mining Sciences,* 14 Apr. 2005, Page 1-20.

In addition, A. Ledesma et al proposed a probabilistic framework to perform inverse analysis of geotechnical problems. The formulation allows the incorporation of existing prior information on the parameters in a consistent way. The method is based on the maximum likelihood approach that allows a straightforward introduction of the uncertainties measurements and prior information. However this approach is based on the mathematical optimization theory and doses not include the complex geological mechanisms in the model. See, A. LEDESMA, A. GENS, E. E. ALONSO, *Parameter and Variance Estimation in Geotechnical Backanalysis Using Prior Information, International Journal for Numerical and Analytical Methods in Geomechanics,* Vol. 20, 1996, Page 119-141.

Further, F. Tonon et al addressed an estimation of boundary conditions for rock mass by means of Bayesian identification procedures. See, F. TONON, B. AMADEI, E. PAN, D. M. FRANGOPOL, *Bayesian Estimation of Rock Mass Boundary Conditions with Applications to the AECL Underground Research Laboratory, International Journal of Rock Mechanics & Mining Sciences,* 22 Jun. 2001, Page 995-1027. In Tonon's paper, the estimation of boundary conditions for rock mass models is addressed by means of Bayesian identification procedures. For linearly elastic rock masses, the boundary conditions are computed in a one-step solution. For rock masses with non-linear behavior, an iterative procedure must be followed. However, the uniform boundary conditions assumed in the model can not meet the requirement of complex geological conditions.

Additionally, S. D. McKinnon focused on stress input modification to account for the incorrect rock modulus resulting from strain measurement in his work. See, S. D. MCKINNON, *Analysis of Stress Measurements Using A Numerical Model Methodology, International Journal of Rock Mechanics & Mining Sciences,* 12 Jul. 2001, Page 699-709. McKinnon described a method that enables the boundary conditions of numerical models to be calibrated to individual or groups of stress measurements. The stress field at any point is assumed to be comprised of gravitational and tectonic components. The tectonic component is assumed to act entirely in the horizontal plane in the far-field and at the model boundary. Unit normal and shear tractions are applied to the model boundaries and the response is computed at the location of the measurement points in the model. An optimization procedure is used to compute the proportions of each unit response tensor that is required, in addition to the gravitational stress, to reproduce the measured stress at the measurement point in the model. However, same as F. Tonon's approach, McKinnon uses the uniform far-field boundary conditions, which is not the case for most geological structures

SUMMARY OF THE INVENTION

A first aspect of the invention is directed to a method to invert boundary conditions for rock mass field in-situ stress computation for a geologic structure, the method comprising the following steps: a) building a numerical model from a geological model of the geologic structure; b) inputting source data measured from the geologic structure into the numerical model; c) computing gravitational stress of the geologic structure by gravitational loading; d) computing at least one tectonic stress induced by unit tectonic effect; e) solving normal equations of penalized weighted least squares; f) determining whether the end criterion has been reached and if not return to step d, and if the end criterion has been reached, proceed to step g; and g) outputting boundary conditions and compute and output final in-situ stress field of the geologic structure.

A second aspect of the invention is directed to a method to invert boundary conditions for rock mass field in-situ stress computation for a geologic structure, the method comprising: considering physical constraint of the geological structure; deriving and solving normal equations of penalized weighted least squares, said normal equations of penalized weighted least squares partially representing said physical constraint of the geological structure; and outputting boundary conditions and reproducing the rock mass field in-situ stress based on the result of said solved normal equations of penalized weighted least squares.

Additional objects and advantages of the invention will become apparent skilled in the art upon reference to the detailed description taken in conjunction provided figures.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION OF THE INVENTION

This invention develops a new technique to invert the boundary conditions for rock mass field in-situ stress computation. The proposed inverting procedure is based on the physical assumption that the in-situ stress can be decomposed into gravitational, tectonic, thermal and residual components, where the tectonic component can be simulated by applying the appropriate horizontal stress or displacement at the far-field boundary by using numerical tools, such as Finite Element Method (FEM) and Finite Difference Method (FDM). The Penalized Weighted Least Squares Method (PWLS), an optimization algorithm that includes both mathematical and physical fittings of the model prediction with the source data input for inversion, is developed to invert the tectonic boundary conditions and then to reproduce the rock mass field in-situ stress.

The optimization algorithm includes two parts: Weighted Least Squares Method, adopted to obtain a mathematical best-fit by taking into account the source data uncertainties, and Penalty Function, designed to ensure a geomechanical reasonable solution in complex tectonic geological structure. Corresponding iteration algorithm is also incorporated to address the nonlinear behavior of rock mass field.

Figure 1:
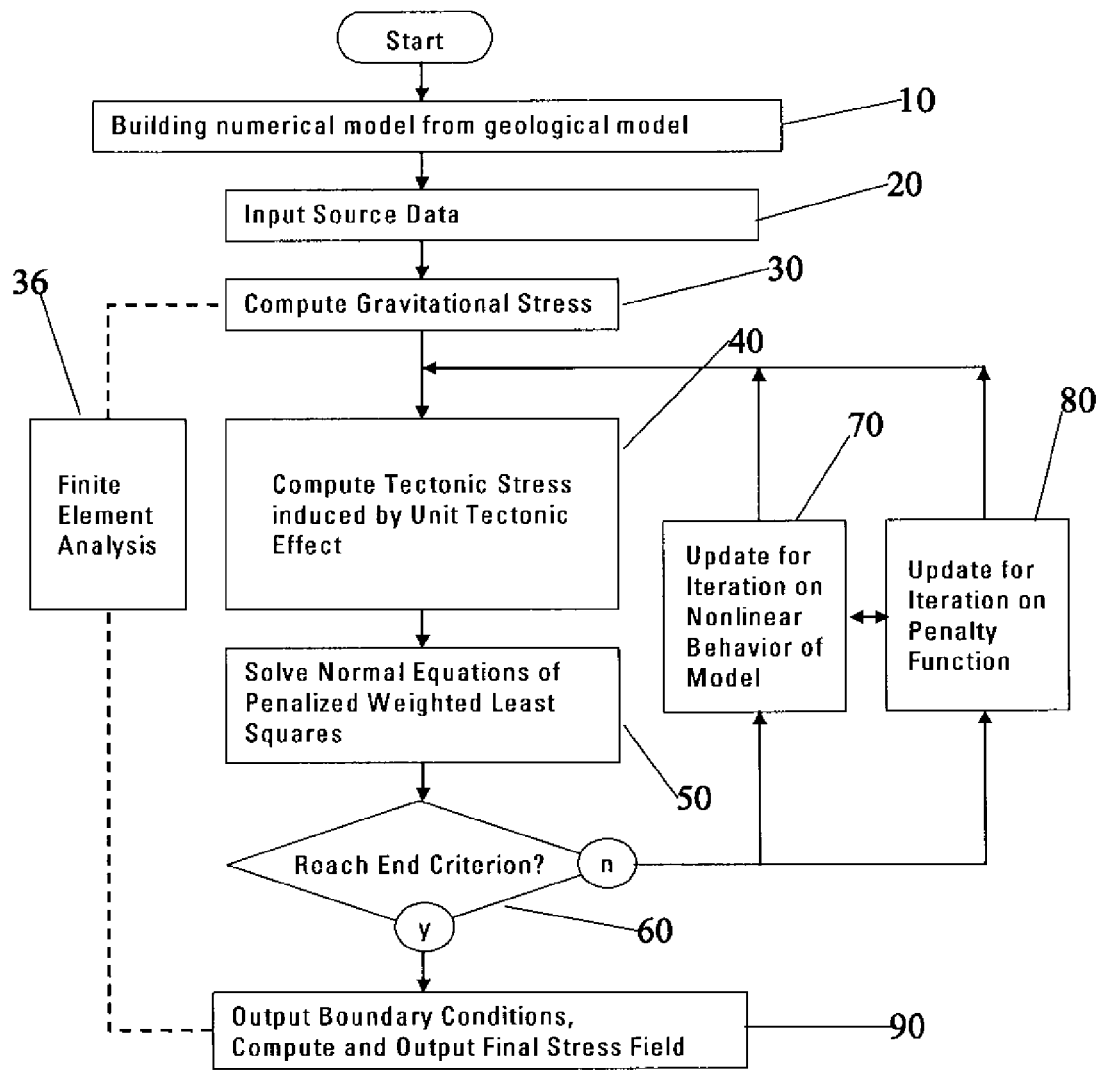
FIG. 1 is a flowchart showing steps associated with the present method, apparatus, and article of manufacture.

FIG. 1 is a schematic flow chart of the steps of the system and method of this invention. According to the method and system of this invention, one needs to build a numerical model (grids) from a geological model, as shown as step 10 in FIG. 1. In one embodiment of the invention, when one is building a numerical model of domain under consideration, the geologic information, such as rock mass layers, faults and so on, should be included in the model. For example, the grid should be shaped according the geologic structure, and the mechanical properties of each element distinct by the grids should be assigned from lithology information. In one embodiment of the invention, in some simple cases, the numerical model can be created by the program itself. In another embodiment of the invention, the numerical model can be created by other reprocessing program.

Once the numerical model has been built from a geological model, the source data should be inputted as necessary information for further boundary condition inversion and in-situ stress computation. The receive source data step is shown as step 20 in FIG. 1. The set of source data typically includes stress related information measured from boreholes or from the field, and the inherent uncertainties of this information. Both direct stress measurement from borehole and indirect stress information from borehole (such as borehole breakout and drilling induced fractures, etc) can be input as source data for inversion. In one embodiment of the invention, source data includes data generated from MDT tools. In another embodiment of the invention, source data includes data measured from borehole using caliper and Fullbore Formation MicroImage (FMI).

Once the formation data have been received, then it would be possible to compute the gravitational stress component, which is indicated as step 30 in FIG. 1. In one embodiment of the invention, Finite Element Method (FEM) is applied to compute the gravitational stress component. In another embodiment of the invention, Finite Difference Method (FDM) is applied to compute the gravitational stress component.

Before we go to next step, as a normal approach in geomechanical modeling, we assume that the current in-situ stress can be decomposed into gravitational, tectonic, thermal and residual components, written as:

$$\sigma^{tot} = \sigma^{gra} + \sigma^{tec} + \sigma^{the} + \sigma^{res} + \ldots \quad (1)$$

where $\sigma^{gra}$, $\sigma^{tec}$, $\sigma^{the}$ and $\sigma^{res}$ are the gravitational, tectonic, thermal and residual stress components respectively. The gravitational component can be computed by gravitational loading. In general, thermal and residual components of the stress are less important as gravitational and tectonic components, and can be neglected or simplified in modeling, as disclosed by S. D. Mckinnon. See, S. D. MCKINNON, *Analysis of Stress Measurements Using A Numerical Model Methodology, International Journal of Rock Mechanics & Mining Sciences,* 12 Jul. 2001, Page 699-709. Therefore, the current in -situ stress can be simplified as:

$$\sigma^{tot} \approx \sigma^{gra} + \sigma^{tec} \quad (2)$$

To calculate the current in-situ stress, it is needed to solve the tectonic stress component, which is indicated as step 40 in FIG. 1.

Figure 2:
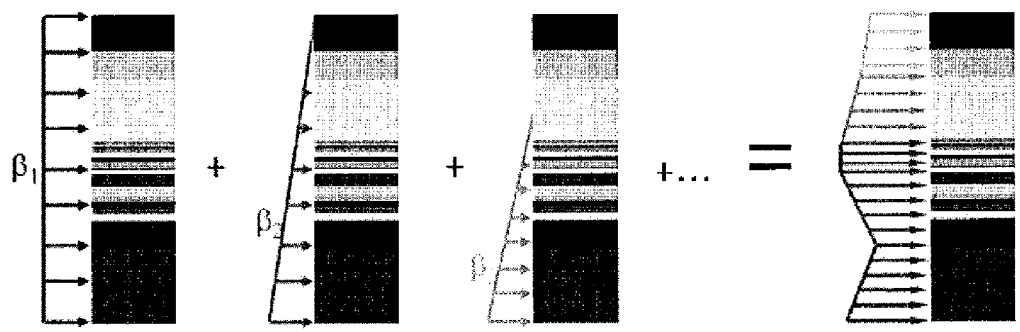
FIG. 2 is a diagram showing one embodiment of the invention to simulate the tectonic effect on rock mass field by boundary loading.

The tectonic stress component can be modeled by applying a set of appropriate horizontal stresses or displacements at the far-field boundary. For example, to simulate the tectonic effect on rock mass field by boundary loading, the complicated tectonic process can be decoupled into a set of simple boundary loading patterns, such as $\beta_1$, $\beta_2$ and $\beta_3$, as shown in FIG. 2. The set of tectonic effects applied to the system boundary have the unknown parameters $\beta_i (i=1, 2, \ldots, p)$ that need to be inverted. By using this pattern of tectonic boundary, the system will have the flexibility of modeling the complicated tectonic process, such as overburden deposition, repeated cycles of elevation and discontinued tectonic effect that occurred during the sedimentary history of the geological system, and gives reliable estimation of tectonic boundary.

In one embodiment of the invention, boundary loading patterns $\beta_1, \beta_2, \ldots, \beta_p$ are displacements that applied to the far-field boundary of the system to simulate the tectonic effects occurred during the sedimentary history of the geological system. In another embodiment of the invention, $\beta_1, \beta_2, \ldots, \beta_p$ can be the normal stress that applied to the far-field boundary of the system to simulate the tectonic effect.

In one embodiment of the invention, from linear elastic theory, the tectonic induced stress of the rock mass field can be written as:

$$\sigma^{tec} = \sum_{i=1}^{p} \beta_i (\sigma^{tec0})_i \qquad (3)$$

where $(\sigma^{tec0})_i$ is the tectonic stress induced by the i-th unit tectonic effect ($\beta_i=1$), which can be computed from FEM, FDM or other numerical tools. Here $\sigma^{tec}$ is the sum of tectonic stress that induced by the tectonic history.

Assuming we have n-points of stress (stress element) measurements $(\sigma^{mea}_j)$, j=1, 2, ... n, the objective of our work is to invert parameters $\beta_i$ in the following function:

$$Y = X\beta + \delta \qquad (4)$$
$$Y = \{\sigma^{mea}_j - \sigma^{gra}_j\}, X = (\sigma^{tec0})_{ij}, \beta = \{\beta_i\}; \delta = \{\delta_j\}$$
$$i = 1, 2, \ldots p, \quad j = 1, 2, \ldots n$$

where $(\sigma^{tec0})_{ji}$ is the tectonic stress induced by i-th unit tectonic effect ($\beta_i=1$) at j-th measurement point and $\delta_j$ is its error. We assume that $Var[\delta]=v^2 V$, where $v^2 V$ is a n×n positive-definite matrix containing the uncertainty of measured in-situ stress. With taking into account of the uncertainty of measured data and neglecting thermal and residual effects, the objective of our work is to invert parameters $\beta_i$ by minimizing the objective function:

$$f(\beta) = \delta' V^{-1} \delta \qquad (5)$$

The inversion procedure can be carried out mathematically by using Weighted Least Squares Method. But the problem with this procedure is the solution may show physically unreasonable results, especially for the case of complex geological structure. This is because the above optimization function is to minimize the error between the model and measurement in few points where the source data for inversion are located without consideration of the whole numerical model. In other words, it will produce the mathematically correct result at measurement points, but physically unreasonable result in the whole interested domain. A typical example of this problem can be explained as: Assuming in a structure that two sets tectonic boundaries ($\beta_1$ and $\beta_2$) must be applied to simulate the tectonic effect, and the stress measurements to invert $\beta_1$ and $\beta_2$ are $\sigma^{mea}_j$, j=1, 2, ..., n>=3, then probably we will get the inverted solution of $\beta_1$ and $\beta_2$ that are two large numbers contrasted to each other, with their total contribution to tectonic stress, $\sigma^{tec}=\beta_1 \sigma^{tec0}_1+\beta_2 \sigma tec0_2$ very close to the input measured data at the area where the input data are located (mathematically fitting), but from the physics this kinds of solution is not feasible.

To overcome this problem, physical consideration or constraint should be added to the optimization function. More generally, we hereby derive a new objective function of weighted least squares by adding a penalty term:

$$f(\beta) = \delta' V^{-1} \delta + \omega \cdot g(\beta) \qquad (6)$$

where $\delta V^{-1} \delta$ is still the sums of weighted square errors, $g(\beta)$ is the penalty function including the constraints on boundary stress or displacements and $\omega$ is the penalty parameter to control the contribution of penalty function. This penalty function is used to prevent the solution from leaving physical feasible region during the optimization process. By solving the above normal equations of penalized weighted least squares, which is indicated as step 50 in FIG. 1, we can invert tectonic stress component while considering the physical constraint of the geological system.

Thus, from $\partial f(\beta)/\partial \beta = 0$ we obtain the penalized weighted least squares estimation:

$$\beta = (X'V^{-1}X + D1)^{-1}(X'V^{-1}Y = D2) \qquad (7)$$

where D1 and D2 are two matrixes containing elements of different parts of derivative of $g(\beta)$ with respect to $\beta$.

Based on the general idea of penalty function, we now discuss how to select the penalty function and penalty parameter. The key idea of this penalty function is to add physical constraints to the optimization function, and the penalty parameter $\omega$ controls the contribution of the penalty function to the total objective function $f(\beta)$.

Depending on the geological structure and prior-information of a practical problem, the following three kinds of penalty functions can be used:

For relatively uniform geological structure, or complex structure that no other information about tectonic effect is available, the elastic energy applied to rock mass field by tectonic effects is used to define the penalty function:

$$g(\beta) = \sum_{i=1}^{p} \left( \frac{\sqrt{W_i}}{\sqrt{W_1}} - 1 \right)^2 \qquad (8)$$

where $W_i$ is the elastic energy applied by the tectonic effect $\beta_i$. Adding this function will control the solution from having big contrasted values, as discussed in the previously example.

For the cases that some prior information about tectonic effects can be guessed from geological information, such as faults slipping, the following penalty function can be used:

$$g(\beta) = \sum_{i=0}^{l} \left( \frac{\gamma_i}{\Delta_i} - 1 \right)^2 \qquad (9)$$

where $\gamma_i$ is the tectonic boundary displacement at a certain depth, that can be computed from $\beta_i$ and its depth, $\Delta_i$ is the corresponding displacement guessed from prior information, and l is the number of guessed $\Delta_i$ For the cases where the range of tectonic displacement at boundary could be given as prior-information, the following penalty function can be used:

$$g(\beta) = \sum_{i=0}^{l} \left( \frac{\gamma_{i,max}}{\gamma_{i,max} - \gamma_i} + \frac{\gamma_{i,min}}{\gamma_i - \gamma_{i,min}} \right)^2 \quad (10)$$

where $\gamma_{\gamma i,min}$ and $\gamma_{i,max}$ are ranges of tectonic displacement at boundary at a certain depth.

Using these penalty functions, the selection of penalty parameter is very flexible and should be decided according to each actual application. The penalty parameter can also be solved in an iterative form as following equation.

$$f(\beta^k) = (\delta' V^{-1} \delta)^k + \alpha (\delta' V^{-1} \delta)^{k-1} g(\delta^k) \quad (11)$$

where $\epsilon' V^{-1} \epsilon$ is the sum of squares errors, and $\alpha$ is a small number to govern the amount of contribution from the penalty functions. The superscript k refers to the k-th iteration. In the iteration process to minimize the objective function, the penalty parameter $\alpha(\delta' V^{-1} \delta)^{k-1}$ changes in each step to keep the percentage of contribution from penalty function at almost a same level.

It should be mentioned that the proposed inversion model and its weighted least squares estimation are based on the linear elastic theory and superposition rule of stress components. But in practical applications, nonlinear behaviors always appear in the domain of interest, and thus in the numerical model an iteration algorithm can be introduced to deal with this nonlinear behavior, which is indicated as step 70 in FIG. 1.

Once the normal equations (7) of penalized weighted least squares are solved, the results can be used to compare with the end criterion to indicate accuracy of the result, which is indicated as step 60 in FIG. 1. In one embodiment of the invention, the end criterion is $$^k R = \sqrt{\sum_j^n (^k \xi_j - \sigma_j^{tec-mea})^2 \Big/ \sum_j^n (\sigma_j^{tec-mea})^2} \leq \varepsilon \quad (12)$$

where $^k\xi_j$ is the computed tectonic stress of k-th iteration at j-th measurement point, $\sigma_j^{tec-mea}$ is "measured tectonic stress" at j-th measurement point which can be obtained by $\sigma_j^{tec-mea} = \sigma_j^{mea} - \sigma_j^{gra}$, $^kR$ is total relative error of k-th iteration and $\epsilon$ is the specified threshold. Here the k-th iteration can be the iteration on nonlinear model behavior or the iteration on penalty function.

If the end criterion has not been reached, in one embodiment of the invention, it is necessary to update for iteration on nonlinear behavior of the numeric model and return to step 40, which is indicated as step 70 in FIG. 1. In another embodiment of the invention, if the end criterion has not been reached, it is necessary to update for iteration on penalty function and return to step 40, which is indicated as step 80 in FIG. 1. Still in another embodiment of the invention, if the end criterion has not been reached, it is necessary to update for iteration on nonlinear behavior of the numeric model (where an inner iteration is used) and to update for iteration on penalty function (where an outer iteration is used), which is indicated as step 70 to step 80 (or vice versa) then return to step 40.

If the end criterion has been reached, either after one or more times process of steps 70 or 80 or without processing steps 70 or 80, output boundary conditions and compute and output final stress field of the geologic structure, which is indicated as step 90 in FIG. 1.

Specifically, in one embodiment of the invention, g(β), the penalty function including the constraints on boundary stress or displacements, can be represented by either of equations (8)-(10) depending on the geological structure and prior-information of a practical problem. ω, the penalty parameter to control the contribution of penalty function, can be represented by $\alpha(\delta' V^{-1} \delta)^{k-1}$ by solving equation (11).

Once g(β) and ω are decided, equation (7) can be derived and consequently equation (3) and equation (2) can also be solved. Therefore, by assuming that the in-situ stress can be decomposed into gravitational and tectonic components, we derived the Penalized Weighted Least Squares Method (PWLS) that includes both mathematical and physical fittings of the model prediction with the stress measurements and/or other field information, to invert the tectonic boundary conditions and then to reproduce the rock mass field in-situ stress. By applying the PWLS, the uncertainties of stress measurements and geological information can be considered. In addition, this model can be used in more general complex geological conditions and nonlinear properties of rock mass can be modeled.

To demonstrate the usability of the invention, we now provide some experimental results of applying the current invention to invert boundary conditions and compute the in-situ stress for Appalachian Plateau field. The data we used for this study were quoted from Evans and Plumb et al (Geophysical Log Responses and Their Correlation With "Bed-to-Bed Stress Contrasts in Paleozoic Rocks, Appalachian Plateau, New York) and Evans et al (Appalachian Stress Study 1. A Detailed Description of In Situ Stress Variations in Devonian Shales of the Appalachian Plateau). The plateau is an allochthonous sheet detached within the Silurian Salts below the Devonian section. A wealth of measured stress data is available in three wells that penetrating the formation rock mass to around 1000 meters depth: Wilkins, Appleton and O'Dell.

Figure 3:
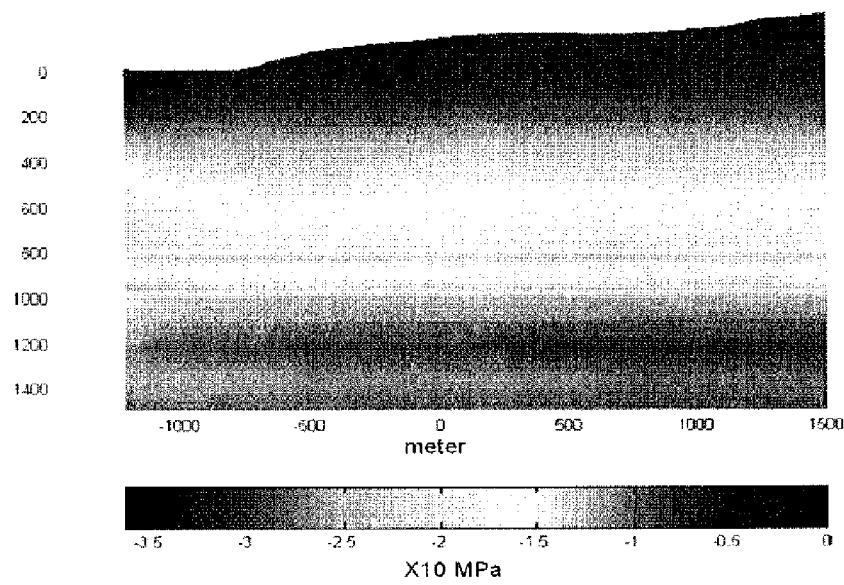
FIG. 3 is a diagram showing computed Minimum horizontal stress contour of Appalachian Plateau as one example of the present method.

A 2D model is built on the plane that covered the three wells. The geological layers and formation rock mechanical properties are evaluated based on geological information and wireline data. Using the minimum horizontal stress measured at Wilkins well as input source data for inversion, the tectonic boundary of the rock mass field is inverted and the in-situ stress field computed from the inverted tectonic boundary. The resulted minimum horizontal stress field is shown in FIG. 3.

Figure 4:
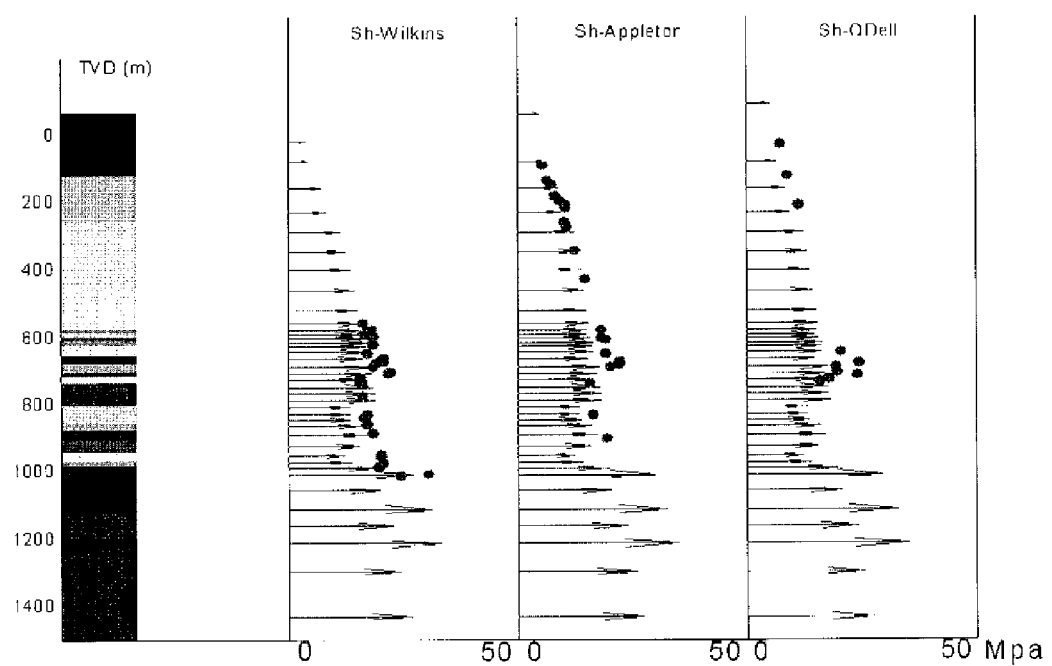
FIG. 4 is a diagram showing the comparison of measured minimum horizontal stress (represented by dots) and the inverted minimum horizontal stress using the present method (represented by arrays) at the three wells in Appalachian Plateau.

Measured stress at well Appleton and O'Dell is used to validate this invention, as shown in FIG. 4. The computed minimum horizontal stress inverted from this invention (represented by arrays) and the measured minimum horizontal stress (represented by dots) at well Appleton and O'Dell is displayed in the same plot for comparison. The plot shows a good match between the inverted results and the measurement.

Therefore, the current invention takes into account errors associated with different measurements and information. The current invention also introduces a penalty function to traditional weighted least squares to constrain the inversion parameters, thus keeps the solution from leaving the feasible region. The result of application of the current invention thus becomes fairly good mathematically as well as physically meaningful.

The flowchart in FIG. 1 illustrates the architecture, functionality, and operation of possible implementations of systems and methods according to various embodiments of the present invention. In this regard, each block in the flowchart may represent a module, segment, or portion of code, which comprises one or more executable instructions for implementing the specified logical function(s). It will also be noted that each block of the flowchart illustration, and combinations of blocks in the flowchart illustration, can be implemented by special purpose hardware-based systems which perform the specified functions or acts, or combinations of special purpose hardware and computer instructions.

While the disclosure has been particularly shown and described with reference to exemplary embodiments thereof, it will be understood by those of ordinary skilled in the art that various changes in form and details may be made therein without departing from the spirit and scope of the present invention as defined by the claims. In addition, those of ordinary skill in the art appreciate that any arrangement which is calculated to achieve the same purpose may be substituted for the specific embodiments shown and that the invention has other applications in other environments. Therefore, it is intended that the scope of the invention be defined by the accompanying claims and their equivalents.

What is claimed is:

1. A method to invert boundary conditions for rock mass field in-situ stress computation for a geologic structure comprising:
   a. building a numerical model from a geological model of the geologic structure;
   b. inputting source data measured from the geologic structure into the numerical model;
   c. computing gravitational stress of the geologic structure by gravitational loading;
   d. computing at least one tectonic stress induced by unit tectonic effect;
   e. solving normal equations of penalized weighted least squares, wherein the penalized weighted least squares method is represented by:
   $f(\beta) = \delta' V^{-1} \delta + \omega \cdot g(\beta)$, where $\delta V^{-1} \delta$ represents the sums of weighted square errors, $g(\beta)$ represents the penalty function, and $\omega$ is the penalty parameter;
   f. determining whether the end criterion has been reached and if not return to step d, and if the end criterion has been reached, proceed to step g; and
   g. outputting boundary conditions and compute and output final in-situ stress field of the geologic structure.

2. The method as in claim 1 wherein the source data includes stress related measurement and information of the geologic structure and their uncertainties.

3. The method as in claim 1 wherein the source data includes data generated from MDT tools.

4. The method as in claim 1 wherein the source data includes data measured from borehole using caliper and Fullbore Formation MicroImage (FMI).

5. The method as in claim 1 wherein the penalized weighted least squares include Weighted Least Squares Method representing uncertainty of the measured data and Penalty Function representing geomechanical feature of the geological structure.

6. The method as in claim 1 further comprising selecting the penalty function and penalty parameter.

7. The method as in claim 1 further comprising selecting the penalty function by applying the elastic energy.

8. The method as in claim 1 further comprising selecting the penalty function by applying tectonic boundary displacement and the corresponding displacement.

9. The method as in claim 1 further comprising selecting the penalty function by applying range of tectonic displacement at boundary at a certain depth.

10. The method as in claim 1 wherein step f further includes updating for iteration on nonlinear behavior of the numeric model.

11. The method as in claim 1 wherein step f further includes updating for iteration on penalty function.

12. The method as in claim 1 further comprising assuming that the in-situ stress can be decomposed into gravitational, tectonic, thermal and residual components.

13. The method as in claim 12 further comprising assuming that thermal and residual components can be neglected so that the in-situ stress can be decomposed into gravitational and tectonic components.

14. The method as in claim 12 further comprising simulating the tectonic component by applying the appropriate horizontal stress or displacement at the far-field boundary by using numerical tools.

15. The method as in claim 1 wherein step d is performed using Finite Element Method.

16. The method as in claim 1 wherein step d is performed using Finite Difference Method.

17. The method as in claim 1 wherein step g is performed using Finite Element Method.

18. The method as in claim 1 wherein step g is performed using Finite Difference Method.

* * * * *